United States Patent [19]

Yamamoto et al.

[11] 3,915,711

[45] Oct. 28, 1975

[54] SUBBING LAYER PHOTOGRAPHIC FILMS WITH ADHESIVE

[75] Inventors: Nobuo Yamamoto; Sho Nakao; Toshihiko Takasu; Syunichi Adachihara; Takenori Omichi, all of Kanagawa, Japan

[73] Assignee: Fuji Photo Film Co., Ltd., Minami-ashigara, Japan

[22] Filed: Dec. 10, 1973

[21] Appl. No.: 423,619

Related U.S. Application Data

[63] Continuation-in-part of Ser. No. 169,784, Aug. 6, 1971, abandoned.

[30] Foreign Application Priority Data

Aug. 7, 1970 Japan.................................. 45-69062

[52] U.S. Cl................... 96/87 R; 117/34; 117/46 R; 117/47 A; 117/76 F; 117/138.8 F
[51] Int. Cl.²............................................ G03C 1/80
[58] Field of Search.............. 96/87 R; 117/34, 47 A, 117/46 R, 76 F, 138.8 F

[56] References Cited

UNITED STATES PATENTS

| | | | |
|---|---|---|---|
| 2,926,116 | 2/1960 | Keim.................................... | 162/164 |
| 3,582,339 | 6/1971 | Martens............................... | 96/87 R |

FOREIGN PATENTS OR APPLICATIONS

| | | | |
|---|---|---|---|
| 920,352 | 3/1963 | United Kingdom................. | 96/87 R |
| 1,517,367 | 2/1968 | France................................. | 96/87 R |

*Primary Examiner*—Ronald H. Smith
*Attorney, Agent, or Firm*—Sughrue, Rothwell, Mion, Zinn & Macpeak

[57] ABSTRACT

An undercoating method for photographic film which comprises applying to the surface of a bi-axially orientated and thermally fixed polyethylene terephthalate film at least one undercoat containing a polyamide-epichlorohydrin resin prepared by the reaction of a polyamide which is a reaction product of a polyalkylene polyamine and a dibasic carboxylic acid with epichlorohydrin before coating thereon, a light-sensitive emulsion layer.

11 Claims, 2 Drawing Figures

SUBBING LAYER PHOTOGRAPHIC FILMS WITH ADHESIVE

This application is a continuation-in-part application of Ser. No. 169,784, filed Aug. 6, 1971, now abandoned.

BACKGROUND OF THE INVENTION

1. Field of the Invention

This invention relates to a method of undercoating polyethylene terephthalate film. In particular, the invention relates to a method of undercoating polyethylene terephthalate film for photographic films bi-axially oriented and thermally fixed. The feature of this invention is to strengthen the adhesion between a bi-axially oriented and thermally fixed polyethylene terephthalate film support and a light-sensitive emulsion layer by incorporating a polyamide-epichlorohydrin resin in the undercoat present between the support and the light-sensitive emulsion layer following subjecting the oriented and thermally fixed film to a flame treatment or ultraviolet radiation.

2. Description of the Prior Art

Owing to the excellent dimensional stability, a bi-axially oriented and thermally fixed polyethylene terephthalate film (hereinafter, the film is called "PET film") has been widely used as printing materials and supports for photographic films. However, although the PET film has excellent properties as the support for photographic films, it has a high hydrophobic property and hence it is difficult to strongly adhere a photographic emulsion containing gelatin having a high hydrophilic property to the support made of the PET film. Therefore, such undercoating has been employed generally that a hydrophobic resin layer adhering well to the PET film and having good solubility is formed on the PET film support and then a hydrophilic resin layer is formed on the hydrophobic resin layer before the application of the photographic emulsion layer. However, such an undercoating method is undesirable from an economical view point as well as from operation step since expensive polymers must be used in such undercoating method and also two layers must be applied. Some attempts for improving the above difficulties have been disclosed in, for instance, Japanese Pat. Nos. 553,005 and 553,006. According to the disclosures the PET film support for photographic films can be undercoated without accompanied with the above-mentioned faults by irradiating the surface of the PET film support by ultraviolet rays and by applying to the irradiated surface of the support a hydrophilic resin solution or a gelatin dispersion in a mixed organic solvent containing a solvent or a swelling agent for polyethylene terephthalate.

Other attempts have been disclosed in the specifications of U.S. Pat. No. 3,072,483; British Pat. No. 1,146,215; British Pat. No. 1,168,171; and British Pat. No. 1,140,651, in which the aforesaid difficulties are overcome by subjecting the surface of the PET film support to a flame treatment before the application of undercoating.

However, in order to obtain a desired adhesive power of the PET film base by the surface treatments as mentioned above, it is required to maintain the PET film at a high temperature at the surface treatment and when the PET film is exposed to a high temperature, the elasticity of the film is reduced and thermal shrinkage occurs to reduce the surface properties, which results in, as a case may be, the occurrences of troubles such as the formation of creases.

SUMMARY OF THE INVENTION

As the results of various studies, the inventors have solved the above-mentioned problems by incorporating in the undercoat for the PET film a polyamide-epichlorohydrin resin prepared by reacting polyamide obtained from a polyalkylene and a dibasic carboxylic acid with epichlorohydrin. That is to say, because the addition of the polyamide-epichlorohydrin resin to the undercoat for the PET film increases greatly the adhesive power for the photographic emulsion layer, a photographic film having strong adhesion between the PET film support and the photographic emulsion layer as well as having excellent surface properties of the PET film can be obtained even though the amount of the surface treatment for the PET film base as mentioned above may be reduced.

Furthermore, the important feature of the additive in this invention is that when the additive is incorporated in the undercoat for the photographic film, it gives no bad influences on the light-sensitive emulsion layer applied thereto.

DETAILED DESCRIPTION OF THE INVENTION

The polyamide-epichlorohydrin resin used in this invention may be prepared by an ordinary way (see, e.g., the specifications of Japanese Pat. No. 265,591; U.S. Pat. No. 2,926,116; and U.S. Pat. No. 3,125,552) in which a saturated or unsaturated dibasic carboxylic acid and a polyalkylene polyamine are heated together at the reaction temperature to form a polyamide and the polyamide is reacted with epichlorohydrin.

Examples of the above-mentioned dibasic carboxylic acids used in the above reaction includes such saturated dicarboxylic acids as succinic acid, glutaric acid, adipic acid, pimelic acid, suberic acid, azelaic acid, sebacic acid and the like and such unsaturated dicarboxylic acids as itaconic acid, fumaric acid, maleic acid, citraconic acid, mesaconic acid, and the like.

Examples of the above-mentioned polyalkylene polyamine are such polyethylene polyamines as diethylene triamine, triethylene tetramine, tetraethylene pentamine and the like and such polypropylene polyamines as dipropylene triamine.

At the production of the polyamide-epichlorohydrin resin used in this invention, the dibasic carboxylic acid is reacted with the polyalkylene polyamine at temperatures of about 110°–250°C, preferably 160°–230°C in a polyalkylene polyamine to dibasic carboxylic acid molar ratio of about 0.9/1 to 1.4/1, preferably 1/1 to 1.2/1 and the polyamide prepared above is reacted with epichlorohydrin at temperatures of about 25°–100°C, preferably about 40°–80°C in a molar ratio of epichlorohydrin to the secondary amino group of the polyamide being about 0.5/1 to 2.5/1, preferably about 1/1 to 2/1, whereby the additive giving good adhesive property and good photographic properties as shown in the below-showing examples is obtained.

The typical examples for producing the polyamide-epichlorohydrin resins used in this invention are shown in the following reference examples.

Reference Example 1 (Production of Additive 1):

500 g of diethylene triamine was dissolved in 222 ml of water and while introducing a nitrogen gas into the solution, 632 g of adipic acid was added to the solution.

The mixture was heated to 130°–170°C for 2.5 hours and then to 170°–225°C for 1.5 hours, during which 410 ml of water was distilled away. The product was cooled gradually by removing the heating bath from the reaction system and when the temperature of the system reached 90°–110°C, water was added to make 7,480 ml in the whole volume. While stirring the aqueous solution of polyamide prepared by the above procedure at 50°–55°C, 441 g of epichlorohydrin was added to the solution over a 1 hour period. Thereafter, the mixture was stirred for further 1 hour at 70°C and after cooling the reaction product obtained, the pH of the product was adjusted to 5.5 by using 6N hydrochloric acid. The product was diluted with water to make 8,480 ml in the whole volume. Thus, an aqueous polyamide-epichlorohydrin solution (Additive 1) containing 15% solid content was obtained.

Reference Example 2 (Production of Additive 2):

The same procedure as Reference Example 1 was followed under the same reaction conditions and operation conditions as in the example except that 915 g of tetraethylene pentamine was used in place of diethylene trimine and 1,455 g of epichlorohydrin was used in place of 441 g of epichlorohydrin, and an aqueous polyamide-epichlorohydrin solution (Additive 2) containing 15% solid content was obtained.

The invention will further be explained by the following typical processes and examples but the invention is not limited to them.

BRIEF DESCRIPTION OF THE DRAWINGS

An embodiment of this invention will be illustrated by reference to the drawings.

In the examples the adhesive property of the light-sensitive emulsion layer to the film support was measured and evaluated by the following ordinary tests.

1. Adhesive test in dry state:

A photographic film was subjected to an ordinary photographic processing and after drying, the photographic emulsion layer was divided lattice-like by fine scratch lines using a knife so that the distance between the scratch lines was 3 mm. Then, a pressure-sensitive adhesive tape was attached to the scratched emulsion layer and then stripped off suddenly. If the adhesive power between the emulsion layer and the support film is weaker than that between the emulsion layer and the adhesive tape, the emulsion layer will be separated from the support film carried by the adhesive tape. On the other hand, if the adhesive power between the emulsion layer and the support film is stronger than that between the emulsion layer and the adhesive tape, the emulsion will not be separated from the support when the adhesive tape is pulled and left on the support as it is. In the test, the extent of the adhesion is evaluated as follows. If more than 95% of the whole area of the original emulsion layer is left on the support, the adhesive power is graded as grade A, if 95–85% of the whole area is left, the grade is grade B, and if the area left on the support is less than 84%, the grade is grade C.

2. Adhesive test during photographic processing (and/or in moistened state): The adhesive test is illustrated in FIG. 1 of the accompanying drawings.

Figure 1:
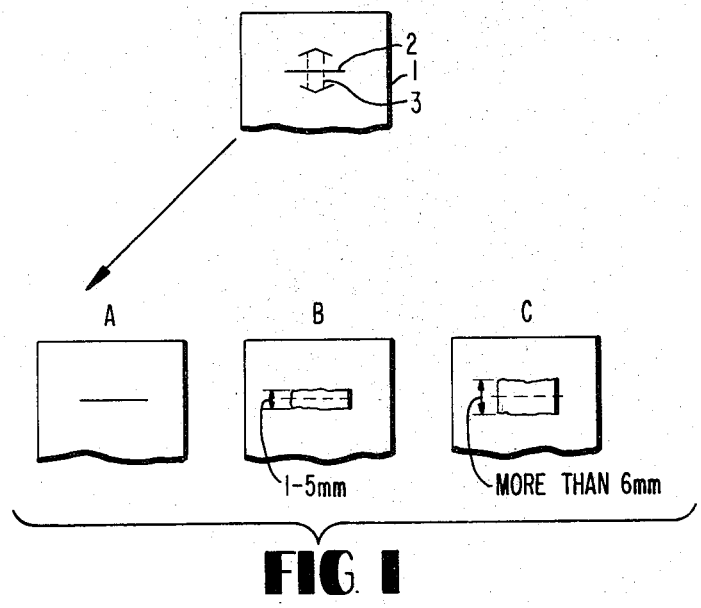
FIG. 1 shows the measuring method of the adhesive test of the light-sensitive emulsion layer with film support.

As shown in FIG. 1, a scratch line 2 of about 50 mm in length was formed in the emulsion layer of a photographic film 1 by using a knife in each photographic processing step of development, fixing, and water washing. Then, a slipping stress 3 is applied to the emulsion layer in the direction perpendicular to the scratch line by using a knife for stripping the emulsion layer from the support film.

In this case the extent of adhesion is evaluated as follows. If the emulsion is not stripped over the scratch formed originally, the adhesion power is graded as grade A; if the emulsion layer is stripped in the range of 1–5 mm, the adhesion power is graded as grade B, and if the emulsion is stripped in the range of larger than 6 mm, the adhesion power is graded as grade C.

EXAMPLE 1

Figure 2:
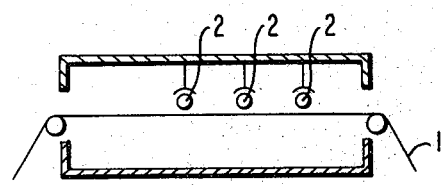
FIG. 2 is a cross sectional view showing the ultraviolet ray radiation apparatus for photographic film.

A PET film support 1 was passed through a processing box of 120 cm in length, 60 cm in width, and 50 cm in depth as shown in FIG. 2 at a speed of 3 meters/min., wherein the film was irradiated by ultraviolet rays at 120°C by means of three 1-kilowatt cylindrical quartz mercury lamps 2 of 50 cm in length and 30 cm in arc length with an interval of 13 cm, and then the film was rolled up. Then, the film was coated with the gelatin dispersion (1), (2), or (3) having the below-showing composition by an ordinary dip coating method and dried for 3 minutes at 120°C. A gelatino-silver halide emulsion was applied to the undercoat and dried to give a photographic film sample. The sample having the additive 1 of this invention in the undercoat was superior in adhesive property between the support film and the emulsion layer in the dried state and also during processing to the comparison sample having no additive of this invention in the undercoat.

|  | Dispersion (1) | Dispersion (2) | Dispersion (3) |
|---|---|---|---|
| Gelatin | 1.0 g | 1.0 g | 1.0 g |
| Water | 1.0 g | 1.0 g | 1.0 g |
| Methanol | 32.0 g | 32.0 g | 32.0 g |
| Methylene chloride | 72.5 g | 72.5 g | 72.5 g |
| Salicylic acid | 0.3 g | 0.3 g | 0.3 g |
| Phenol | 8.0 g | 8.0 g | 8.0 g |
| Tetrachoroethane | 80.0 g | 80.0 g | 80.0 g |
| Additive | 0.2 ml | 1.0 ml | 0 ml |

| Dispersion coated | Adhesive power in dried state | Adhesive power during processing |
|---|---|---|
| (1) | B | A |
| (2) | A | A |
| (3) (control) | B | C |

Also, the photgraphic properties of the photographic film having incorporated in the undercoat the additive of this invention were better and almost same as those in the comparison sample containing no additive of this invention.

EXAMPLE 2

In place of applying the ultraviolet irradiation as in Example 1, the PET film was treated at the surface thereof with air-propane flame for 10 minutes, coated then with the dispersion having the same composition as in Example 1, and dried for 4 minutes at 120°C. A gelatino-silver halide emulsion was applied to the undercoat thus formed and dried to provide a photographic sample. The adheisve power of the sample having the additive 1 of this invention between the support and the undercoat in the dried state and during processing was superior to that of the comparison sample containing additive of this invention.

| Dispersion | Adhesive power in dried state | Adhesive power during processing |
|---|---|---|
| (1) | B | A |
| (2) | A | A |
| (3)(control) | C | C |

Also, the photographic properties of the photographic film containing the additive of this invention were better and was almost the same as those of the comparison sample.

EXAMPLE 3

A PET film support having a thickness of 100 microns and width of about 1 meter was passed through a processing box for exposing to ultraviolet rays using three 3-kilowatt quartz mercury lamps having a length of 1.35 meters and an effecitve arc length of about 1 meter in place of the three quartz mercury lamps in Example 1 and then coated with a gelatin dispersion having the following composition followed by drying for 10 minutes at 120°C.

|  | Dispersion (4) | Dispersion (5) |
|---|---|---|
| Gelatin | 0.4 g | 0.4 g |
| Water | 0.4 g | 0.4 g |
| Methanol | 40.0 g | 40.0 g |
| Acetone | 35.0 g | 35.0 g |
| Acetic acid | 0.4 g | 0.4 g |
| p-chlorophenol | 3.0 g | 3.0 g |
| Additive 2 | 1.33 ml | 0 ml |

Furthermore, a gelatin dispersion consisting of 0.4 g of gelatin, 1.0 g of water, 0.4 g of acetic acid, and 78.4 g of methanol was applied to the undercoat and dried for 20 minutes at 90°C. A gelatino silver halide emulsion was applied to the layer and dried to provide a photographic film sample. The adhesive power of the sample having the additive of this invention in the undercoat in dried state and during processing was higher than that of the comparison sample containing no additive of this invention.

| Dispersion | Adhesion power at dried state | Adhesion power during processing |
|---|---|---|
| (4) | A | A |
| (5) (control) | B | B |

The photographic properties of the photographic film containing the additive of this invention were as good as those of the comparison sample.

EXAMPLE 4

In Example 3, a phenol-methanol (1:4 in weight ratio) solution was applied to the undercoat in place of the gelatin dispersion for overcoat and dried for 20 minutes at 80°C. A gelatino-silver halide emulsion was applied to the overcoat and dried to give a photographic film sample. The adhesive power of the photographic film containing the additive of this invention in dried state and during processing was higher than that of the comparison sample as shown in the following table.

| Dispersion | Adhesive power at dried state | Adhesive power during processing |
|---|---|---|
| (4) | A | A |
| (5)(control) | B | C |

Also, as the results of comparing the photographic properties of the photographic films thus prepared, it was confirmed that the photographic properties of the photographic film containing the additive of this invention in the undercoat were almost as good as those of the comparison sample containing no additive of this invention.

It is known in the prior art as exemplified by U.S. Pat. No. 3,582,339 by Martens et al. to corona activate a polyethylene (PE) support and then coat it with an aqueous solution of gelatin-polyamide epichlorohydrin resin; however, PET and PE are quite different with respect to their physical and chemical properties, particularly their surface properties. For example, when a PE film is used as a support for photographic emulsions, only prior treatment of the film surface by corona discharge as compared with flame treatment or ultraviolet irradiation provides a sufficiently strong adhesion between the film and emulsion layer. However, adhesion between a PET film and an emulsion layer is insufficient if the surface of the PET film is subjected only to corona discharge.

In the Martens et al. patent, (1) the surface of PE film is subjected to corona discharge and then (2) coated with aqueous solution of gelatin-polyamide epichlorohydrin resin.

On the other hand, in the present invention, (1) the surface of the PET film is subjected to UV-irradiation or flame treatment to render the surface of polyester hydrophilic and then the PET film is (2) coated with gelatin-polyamide epichlorohydrin resin in an organic solvent (swelling agent for PET). Thus, Martens et al. and the present invention are quite different in the kind of film to be treated, the method used, the liquid composition for treatment and, most importantly, the resultant treated and coated support.

EXAMPLE 5

Adhesion Effect Depending on Support, Surface Treatment and Coating Liquid

Table 1

| Support | Corona Discharge | Coating after Corona Discharge* | UV Irradiation | Coating after UV Irradiation ** |
|---|---|---|---|---|
| PE | A | A | C | C |
| PET | C | C | C | A |

The treatments and liquid composition used in Example 5 are:

Corona discharge: A support of 100 μ thick and 30 cm long was running at a velocity of 5 m/min on a treating roll (a metal roll coated with rubber of 3mm thick) at a distance of 1.6 mm from electrodes using an oscillator Lepell II-Type with an output of 600W.

*Liquid composition according to the Martens patent:

| Polyamide epichlorohydrin resin(15%) | 3 g |
|---|---|
| Gelatin | 7 g |
| Water | 100 g |

UV-Irradiation: A support of 100 μ and 30 cm was running at a velocity of 5 m/min and irradiated by three UV lamps (Toshiba H-1000) from a distance of 13 cm.

**Liquid composition according to the present invention:

| Polyamide epichlorohydrin resin(15%) | 0.2 g |
|---|---|
| Gelatin | 1.0 g |
| Phenol | 8.0 g |
| Methanol | 32.0 g |
| Water | 1.0 g |
| Salicyclic acid | 0.3 g |
| Tetrachoroethane | 8.0 g |

Adhesion of a light-sensitive photographic emulsion to each support was evaluated according to adhesive test (1) described in this specification. The results are set forth in Table 1 above.

As seen from the results shown in Table 1, even the same pre-treatment and application of a polyamine-epichlorohydrin liquid composition result in different adhesive effects to PE and PET, respectively.

What is claimed is:

1. A photographic film comprising a bi-axially oriented and thermally fixed polyethylene terephthalate film carrying a gelatin light sensitive emulsion layer thereon and an adhesive gelatin undercoat layer comprising incorporated therein a polyamide-epichlorohydrin resin, said resin being prepared by the reaction of a polyamide formed by reacting a polyalkylene polyamide and a dibasic carboxylic acid with epichlorohydrin, positioned between said polyethylene terephthalate film and said emulsion layer to increase the adhesion of said emulsion to said polyethylene terephthalate film, said oriented and thermally fixed polyethylene terephthalate film having been subjected to a flame treatment or ultraviolet radiation prior to the application of said adhesive undercoat.

2. The film of claim 1 wherein said dibasic carboxylic acid is selected from the group consisting of succinic acid, glutaric acid, adipic acid, pimelic acid, suberic acid, azelaic acid, and sebacic acid.

3. The film of claim 1 wherein said dibasic carboxylic acid is selected from the group consisting of itaconic acid, fumaric acid, maleic acid, citaconic acid, and mesaconic acid.

4. The film of claim 1 wherein said polyalkylene polyamine is selected from the group consisting of polyethylene polyamine and polypropylene polyamine.

5. The film of claim 1 wherein said polyethylene polyamine is selected from the group consisting of diethylene triamine, triethylene tetramine, and tetraethylene pentamine.

6. The film of claim 1 wherein said polypropylene polyamine is dipropylene triamine.

7. The film of claim 1 wherein the bi-axially stretched and thermally fixed polyethylene terephthalate film has been subjected to ultraviolet irradiation before the application of the undercoat.

8. The film of claim 1 wherein the bi-axially oriented and thermally fixed polyethylene terephthalate film has been subjected to a flame treatment before the application of the undercoat.

9. The photographic film of claim 1 wherein the molar ratio between said epichlorohydrin and said polyamide ranges from 0.5:1 to 2.5:1.

10. The film of claim 1 wherein said gelatin light sensitive emulsion layer contains silver halide as a photosensitive element.

11. The film of claim 1 wherein said gelatin undercoat layer is applied to said polyethylene terephthalate film in an organic solvent vehicle.

* * * * *